United States Patent [19]

Hsu

[11] Patent Number: 5,738,469
[45] Date of Patent: Apr. 14, 1998

[54] TORQUE ADJUSTMENT CONTROL MECHANISM OF A HAND DRILL

[75] Inventor: Hung-Ming Hsu, Yun-Lin Hsien, Taiwan

[73] Assignee: Regitar Power Tools Co., Ltd., Taiwan

[21] Appl. No.: 597,411

[22] Filed: Feb. 8, 1996

[51] Int. Cl.⁶ .................................................. B23B 45/00
[52] U.S. Cl. .......................... 408/139; 408/124; 192/150; 81/473
[58] Field of Search ........................ 408/6, 139, 124; 81/473; 192/150, 56.1, 56.57, 56.62, 110 R

[56] References Cited

U.S. PATENT DOCUMENTS

| | | | |
|---|---|---|---|
| 3,002,206 | 10/1961 | Johnson | 408/139 |
| 4,317,511 | 3/1982 | Asai | 192/56.57 |
| 4,322,186 | 3/1982 | Boling | 408/139 |
| 4,593,800 | 6/1986 | Ness et al. | 192/150 |
| 4,898,249 | 2/1990 | Ohmori | 81/473 X |
| 5,277,527 | 1/1994 | Yokota et al. | 408/139 |
| 5,545,109 | 8/1996 | Hayakawa | 192/150 X |

Primary Examiner—Daniel W. Howell
Assistant Examiner—Henry W. H. Tsai
Attorney, Agent, or Firm—A & J

[57] ABSTRACT

A torque adjustment control mechanism connected between the motor housing base and chuck of a hand drill and controlled to adjust its output torque, including a connecting barrel connected to the motor housing base, a coupling member mounted within the connecting barrel and coupled to the motor housing base, a holder base fixedly secured to the connecting barrel, and adjustment cap threaded onto the front neck of the holder base to hold an index ring on the inside, and a plurality of holding down spring devices mounted in respective longitudinal through holes on the holder base and stopped between the coupling member and the index ring, wherein the output torque of the hand drill is adjusted by changing the holding down pressure of the holding down spring devices by turning the adjustment cap forwards or backwards relative to the holder base.

6 Claims, 5 Drawing Sheets

5,738,469

TORQUE ADJUSTMENT CONTROL MECHANISM OF A HAND DRILL

BACKGROUND OF THE INVENTION

1. Field of the Invention

This invention relates to hand drills, and relates more particularly to the torque adjustment control mechanism of a hand drill which is connected between the motor housing base and the chuck and, which can be conveniently adjusted to change the output torque of the hand drill.

2. Description of the Prior Art

Regular hand drills are commonly equipped with a torque adjustment control mechanism for the adjustment of the output torque. According to conventional hand drills, this torque adjustment control mechanism commonly uses a stepped push rod forced to press spring means against the driven gear, which is coupled to the driving gear of the motor drive. The adjustment of the stepped push rod is complicated. Because of broad tolerance range of the spring means, the output torque of the hand drill cannot be accurately adjusted, and the torque adjustment control mechanism tends to trip off after an adjustment.

SUMMARY OF THE INVENTION

This invention is directed to a torque adjustment control mechanism of a hand drill which is connected between the motor housing base and the chuck and, which can be conveniently adjusted to change the output torque of the hand drill.

It is one object of the present invention to provide a torque adjustment control mechanism which can be conveniently adjusted to change the output torque of the hand drill by a rotary motion. It is another object of the present invention to provide a torque adjustment control mechanism which can be accurately adjusted to change the output torque of the hand drill to the desired level. It is still another object of the present invention to provide a torque adjustment control mechanism which can be conveniently adjusted to change the output torque of the hand drill subject to the capacity of the motor drive. It is still another object of the present invention to provide a torque adjustment control mechanism which automatically trips off upon an overload. According to one aspect of the present invention, the torque adjustment control mechanism is connected between the motor housing base and chuck of the hand drill, comprising a connecting barrel connected to the motor housing base, a coupling member mounted within the connecting barrel and coupled to the motor housing base, a holder base fixedly secured to the connecting barrel, and adjustment cap threaded onto the front neck of the holder base to hold an index ring on the inside, and a plurality of holding down spring devices mounted in respective longitudinal through holes on the holder base and stopped between the coupling member and the index ring, wherein the output torque of the hand drill is adjusted by changing the holding down pressure of the holding down spring devices by turning the adjustment cap forwards or backwards relative to the holder base. According to another aspect of the present invention, each of the holding down spring devices comprises a steel ball mounted in an annular track at the front end of the coupling member, a spring element inserted into one longitudinal through hole of the holder base and stopped against the respective steel ball, and a pin having one end supported on the respective spring element and an opposite end partially projecting out of the holder base and stopped against the index ring. According to still another aspect of the present invention, the coupling member has a plurality of raised portions raised from the annular track to stop the steel balls of the holding down spring devices in the annular track respectively, and the coupling member will run idle when the steel balls are forced to pass over the respective raised portions upon an overload.

DETAILED DESCRIPTION OF THE PREFERRED EMBODIMENT

Figure 1:
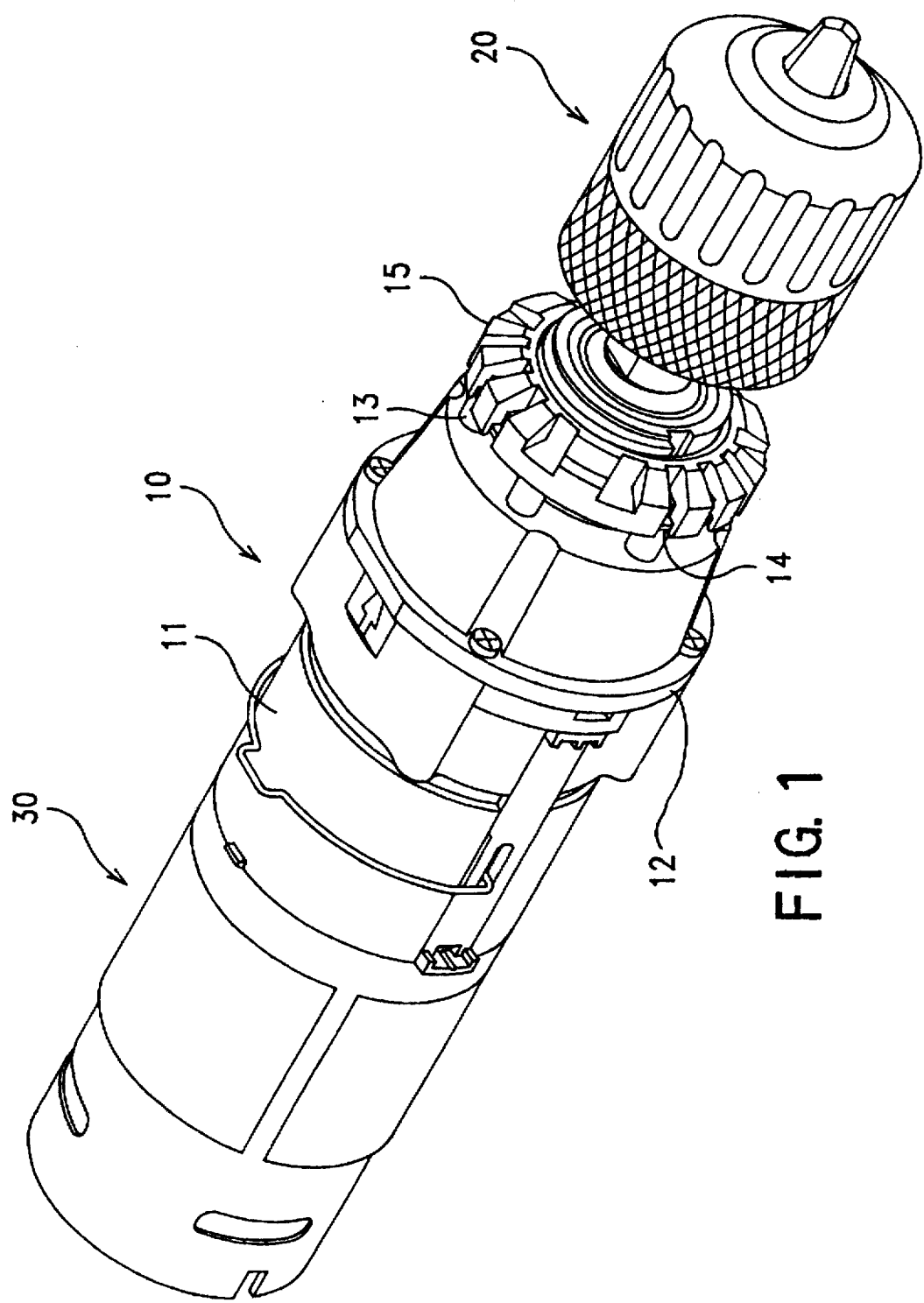
FIG. 1 is an elevational view of the preferred embodiment of the present invention, showing the torque adjustment control mechanism connected between the motor housing base and the chuck.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2A:
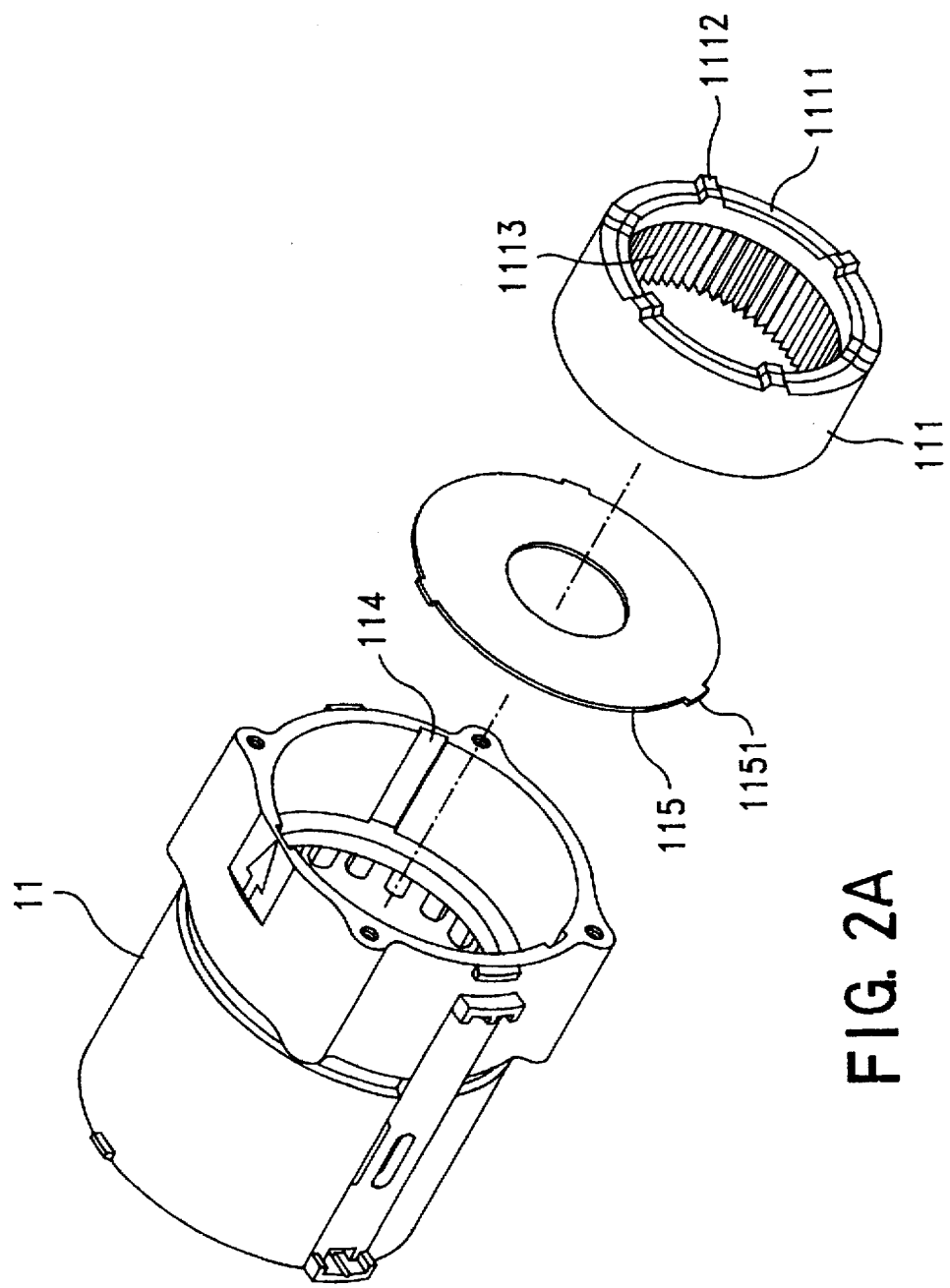
FIG. 2A is an exploded view of the connecting barrel, the cushion, and the coupling member according to the present invention.
Figure 2B:
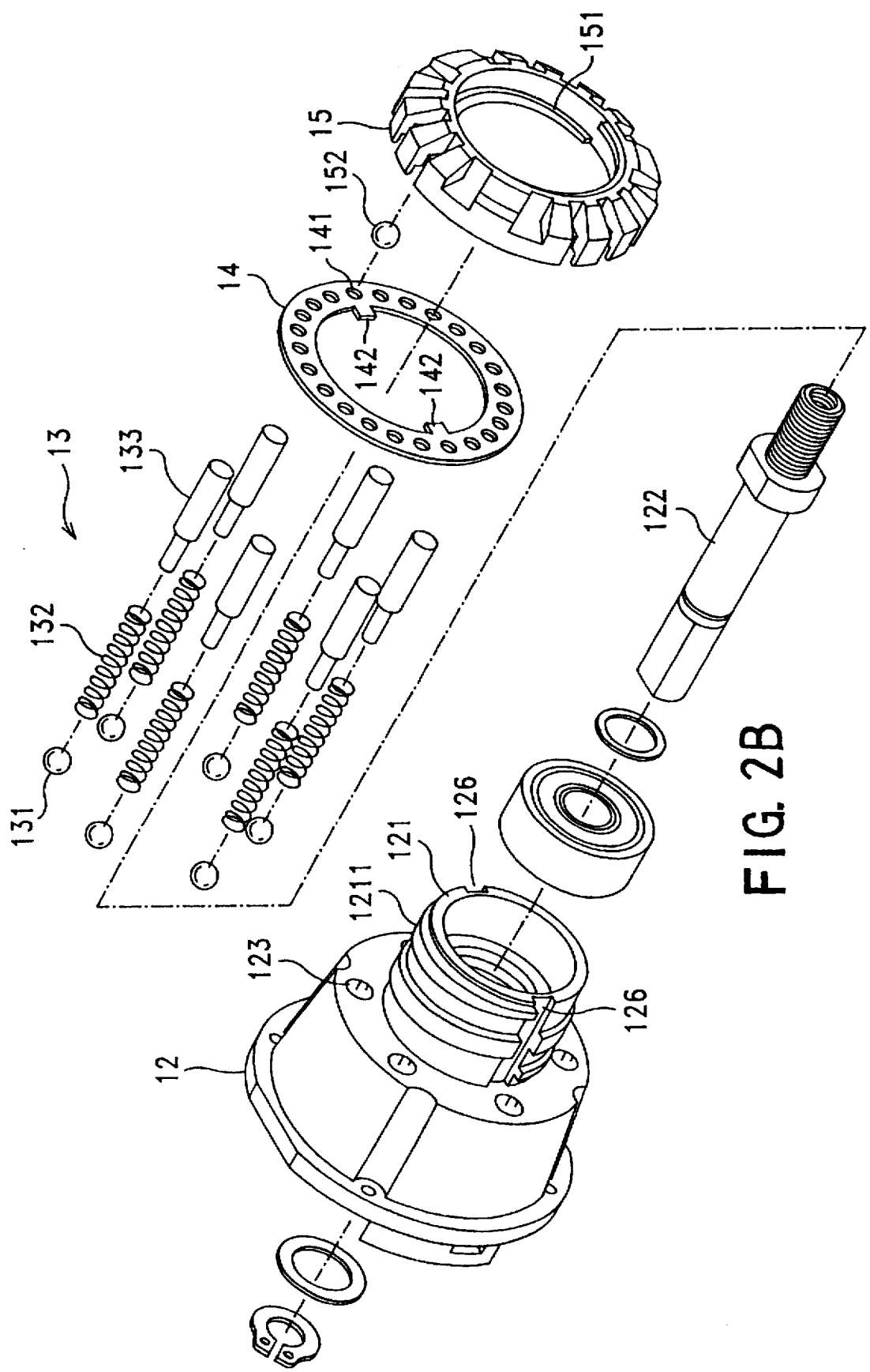
FIG. 2B is an exploded view of the holder base, the spring means, the transmission shaft, the index ring, and the adjustment cap according to the present invention.

Referring to FIGS. 1, 2A, and 2B, a torque adjustment control mechanism 10 is connected between the chuck 20 and motor housing base 30 of a hand drill, comprised of a connecting barrel 11, a holder base 12, a plurality of holding down spring devices 13, an index ring 14, and an adjustment cap 15. The connecting barrel 11 is connected to the motor housing base 30 to hold a coupling member 111, having a plurality of longitudinal grooves 114 equiangularly spaced around the inside wall and respectively extending to the front end. A cushion 115 is mounted within the front end of the connecting barrel 11, having a plurality of projecting portions 1151 raised from the periphery and respectively fitted into the longitudinal grooves 114 of the connecting barrel 11. The coupling member 111 is revolvably mounted within the front end of the connecting barrel 11 and supported on the cushion 115, having an annular track 1111 at the front end, a plurality of raised portions 1112 raised from the annular track 1111, and an internal gear 1113 coupled to the motor housing base 30. The holder base 12 is a hollow, substantially cylindrical member having a plurality of longitudinal through holes 123 around the border, a tubular front neck 121 forwardly raised from the front end thereof, an outer thread 1211 around the tubular front neck 121, and two longitudinal grooves 126 on the outside wall of tubular front neck 121 intersecting the outer thread 1211 at two opposite locations. A transmission shaft 122 is mounted in the holder base 12 and coupled to the power output end of the motor housing base 30. Each of the holding down spring devices 13 comprises a steel ball 131 mounted inside one longitudinal through hole 123 of the holder base 12 and stopped at the annular track 1111 of the coupling member 111, a spring element 132 inserted into the respective longitudinal through hole 123 of the holder base 12 and stopped against the respective steel ball 131, and a pin 133 supported on the respective spring element 132 and partially projecting out of the holder base 12. The index ring 14 is mounted around the tubular front neck 121 of the holder base 12 and stopped against the pins 133, having two inward projecting portions 142 raised from the inner diameter at two opposite locations and respectively forced into engagement with the longitudinal grooves 126 of the tubular front neck 121 of the holder base 12, and a plurality of equiangularly spaced through holes 141. The adjustment cap 15 is covered on the tubular front neck 121 of the holder base 12 to hold the index ring 14 on the inside, having an inner thread 151 threaded onto the outer thread 1211 of the tubular front neck 121 of the holder base 12. At least one steel ball 152 is mounted within the adjustment cap 15 and respectively stopped at one through hole 141 of the index ring 14.

Figure 3:
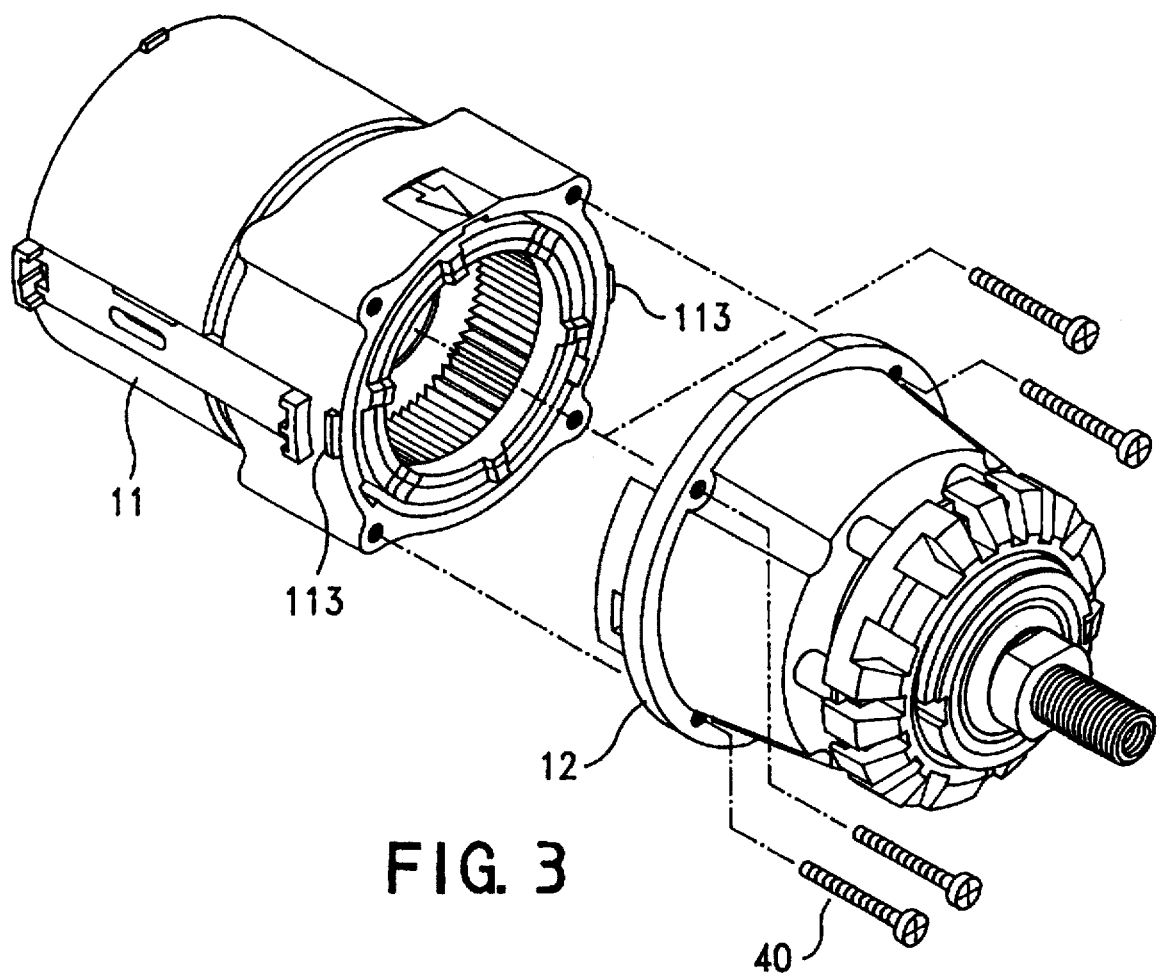
FIG. 3 shows the connection between the connecting barrel and the holder base according to the present invention.
Figure 4:
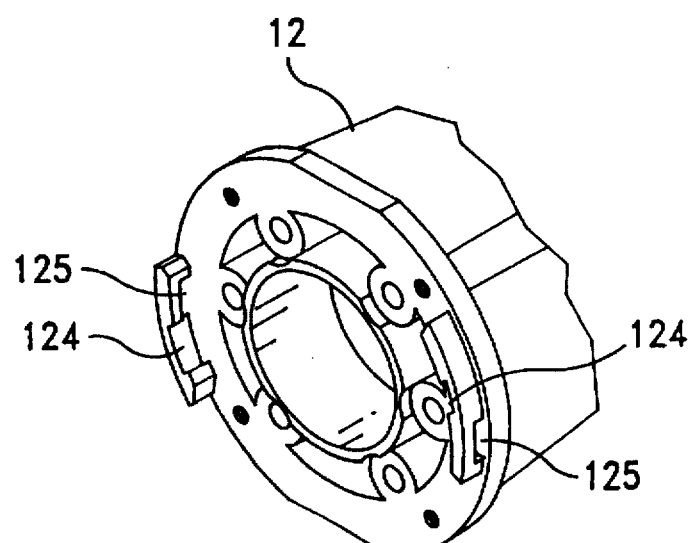
FIG. 4 shows the structure of the rear end of the holder base according to the present invention.

Referring to FIGS. 3 and 4, the connecting barrel 11 further comprises two outward retainer rods 113 raised from the front end at two opposite sides; the holder base 12 further comprises two longitudinal mounting grooves 124 bilaterally disposed at the rear end, and two retaining slots 125 respectively disposed adjacent to the longitudinal mounting grooves 124. The holder base 12 is fastened to the connecting barrel 11 by: inserting the outward retainer rods 113 into the longitudinal grooves 124 and then rotating the holder base 12 relative to the connecting barrel 11 to force the retainer rods 113 into engagement with the retaining slots 125 respectively. When the holder base 12 and the connecting barrel 11 are connected together, screws 40 are fastened to the holder base 12 and the connecting barrel 11 to secure the connection.

Figure 5:
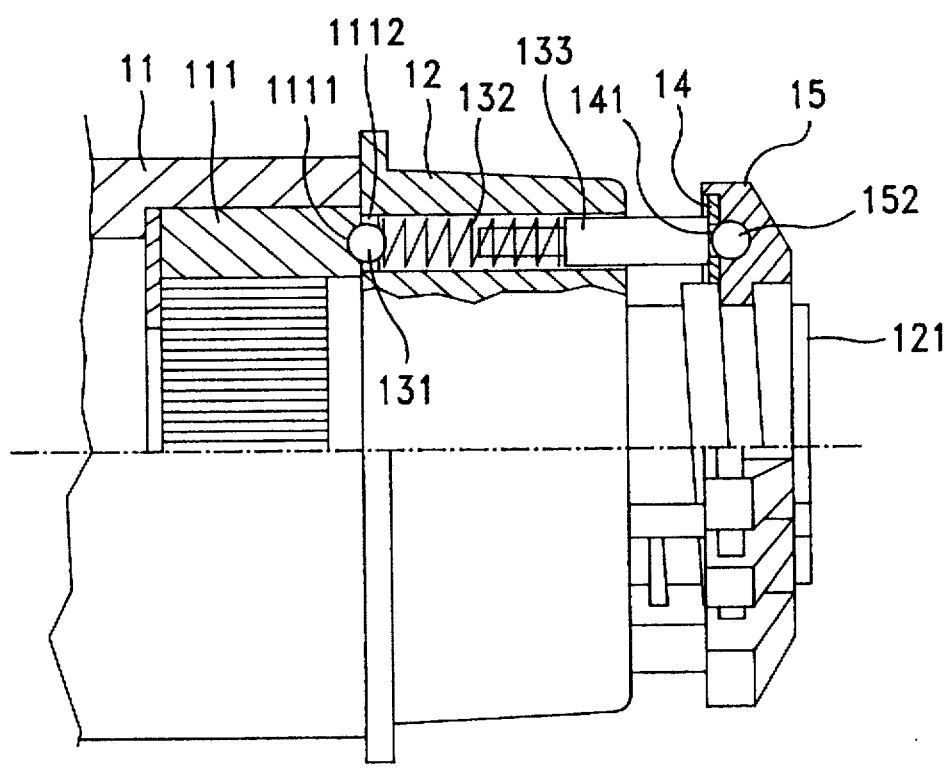
FIG. 5 is a sectional assembly view of the present invention.

Referring to FIG. 5, when assembled, the connecting barrel 11 and the holder base 12 are fixedly connected together, the index ring 14 is mounted around the tubular front neck 121 of the holder base 12, the adjustment cap 15 is threaded onto the tubular front neck 121 of the holder base 12 and stopped at the pins 133 of the holding down spring devices 13 against the respective the spring elements 132, and the steel balls 131 of the holding down spring devices 13 are respectively stopped at the annular track 1111 of the coupling member 111. When the adjustment cap 15 is turned inwards relative to the tubular front neck 121 of the holder base 12, the pins 133 are forced downwards by the index ring 14 to compress the respective spring elements 132 against the respective steel balls 131 and the coupling member 111, and therefore the output torque of the hand drill is positively adjusted. On the contrary, when the adjustment cap 15 is turned outwards relative to the tubular front neck 121 of the holder base 12, less pressure is given to the index ring 14, and therefore the output torque of the hand drill is negatively adjusted.

Furthermore, when an overload is occurred during the operation of the hand drill, the steel balls 131 will be forced to pass over the raised portions 1112, causing the coupling member 111 to run idle.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A torque adjustment control mechanism coupled between a motor housing base and chuck of a hand drill to hold a transmission shaft thereof and controlled to adjust its output torque, the torque adjustment control mechanism comprising:

a connecting barrel connected to the motor housing base;

a hollow, cylindrical coupling member mounted within said connecting barrel, said coupling member having an annular track at a front end thereof, a plurality of raised portions raised from said annular track, and an internal gear coupled to the motor housing base;

a hollow, cylindrical holder base fixedly connected to one end of said connecting barrel remote from the motor housing base to hold the transmission shaft, said holder base having a plurality of longitudinally directed through holes formed around a border thereof, and an externally threaded tubular front neck;

a plurality of hold down spring devices respectively mounted in said longitudinally directed through holes of said holder base and stopped at said annular track of said coupling member;

an index ring mounted around said tubular front neck of said holder base and prohibited from rotary motion relative to said tubular front neck of said holder base and stopped against said hold down spring devices, said index ring having a plurality of equiangularly spaced indexing holes; and an adjustment cap threaded onto said tubular front neck of said holder base to hold said index ring against said hold down spring devices and to hold at least one steel ball on an inside of said adjustment cap and in said indexing holes;

wherein an output torque of the hand drill is adjusted by changing a hold down pressure of said hold down spring devices by turning said adjustment cap forwards or backwards on said tubular front neck of said holder base.

2. The torque adjustment control mechanism as claimed in claim 1 wherein said holder base has two longitudinal mounting grooves bilaterally disposed at a rear end thereof and two retaining slots adjacent to said longitudinal mounting grooves; said connecting barrel having two outward retainer rods raised from a front end thereof at two opposite sides, said front end of said connecting barrel being connected to said rear end of said holder base when said retainer rods of said connecting barrel are respectively inserted into said longitudinal mounting grooves of said holder base and forced into engagement with said retaining slots of said holder base through a relative rotary motion between said holder base and said connecting barrel.

3. The torque adjustment control mechanism as claimed in claim 1 wherein said holder base is longitudinally and fixedly secured to said connecting barrel by screws.

4. The torque adjustment control mechanism as claimed in claim 1 wherein said tubular front neck of said holder base has two longitudinal grooves formed on two opposing sides of an outside surface thereof, said index ring having two inward projecting portions respectively forced into engagement with said longitudinal grooves of said tubular front neck of said holder base to prohibit relative rotary motion between said index ring and said holder base.

5. The torque adjustment control mechanism as claimed in claim 1 wherein each of said hold down spring devices comprises a steel ball mounted in said annular track of said coupling member and stopped at one of a plurality of raised portions formed in said annular track, a spring element inserted into one of said longitudinally directed through holes of said holder base and stopped against said steel ball, and a pin having one end supported by said spring element and an opposite end partially projecting out of said holder base and stopped against said index ring.

6. The torque adjustment control mechanism as claimed in claim 1 wherein said coupling member is mounted within said connecting barrel and supported on a cushion disposed around the transmission shaft, said cushion having a plurality of projecting portions extending from a peripheral portion thereof and forced into engagement with respective longitudinal grooves formed on an inside surface of said connecting barrel.

* * * * *